(12) United States Patent
Lee

(10) Patent No.: US 6,450,517 B1
(45) Date of Patent: Sep. 17, 2002

(54) FOLDING COLLAPSIBLE KICK SCOOTER

(75) Inventor: Guang-Gwo Lee, Taipei (TW)

(73) Assignee: Playmaker Co., Ltd. (TW)

( * ) Notice: Subject to any disclaimer, the term of this patent is extended or adjusted under 35 U.S.C. 154(b) by 0 days.

(21) Appl. No.: 09/793,758

(22) Filed: Feb. 27, 2001

(51) Int. Cl.⁷ .............................................. B62M 1/00
(52) U.S. Cl. .................. 280/87.041; 16/429; 16/900; 280/87.05; 403/146
(58) Field of Search ..................... 280/14.27, 14.28, 280/87.01, 87.021, 87.041, 87.05, 655.1; 16/110.1, 421, 429, 900; 403/83, 84, 145, 146

(56) References Cited

U.S. PATENT DOCUMENTS

| | | | |
|---|---|---|---|
| 6,173,976 B1 * | 1/2001 | Lee | 280/87.05 |
| 6,270,095 B1 * | 8/2001 | Chang | 280/87.041 |
| 6,270,097 B1 * | 8/2001 | Lin | 280/87.05 |
| 6,283,485 B1 * | 9/2001 | Tsai | 280/87.05 |
| 6,286,845 B1 * | 9/2001 | Lin | 280/87.05 |
| 6,305,698 B1 * | 10/2001 | Liang | 280/87.041 |
| 6,317,923 B1 * | 11/2001 | Lo | 16/429 |

* cited by examiner

Primary Examiner—Michael Mar
(74) Attorney, Agent, or Firm—Donald C. Casey

(57) ABSTRACT

A folding collapsible kick scooter includes a head tube folding structure, which uses a quick-release lock to lock the head tube between an extended position and a collapsed position, and a handlebar folding structure, which uses a quick-release lock to lock the left handlebar and the right handlebar between an extended position and a collapsed position.

1 Claim, 9 Drawing Sheets

FOLDING COLLAPSIBLE KICK SCOOTER

BACKGROUND OF THE INVENTION

The present invention relates to kick scooters and, more particularly, to a folding collapsible kick scooter, which comprises a handlebar folding structure and a head tube folding structure.

Kick scooter was developed in German. However, due to its heavy design, young people did not popularly accept kick scooter. In early 1999, Japan manufacturers developed various compact kick scooters that satisfy young people's requirements. Nowadays most kick scooters are made folding collapsible. FIGS. 1A and 1B show a folding collapsible kick scooter according to the prior art. This structure of folding collapsible kick scooter comprises a footplate B holding a rear wheel, a holder frame D fixedly provided at the front side of the footplate B, a head tube and handlebar assembly G, a head tube mounting frame A fixedly fastened to the head tube and handlebar assembly G and pivoted to the holder frame D by a slip joint F. The holder frame D comprises a bottom locating notch E. The head tube mounting frame A comprises a retainer rod C adapted for engaging the bottom locating notch E to hold the head tube and handlebar assembly G in the extended position. Further, a quick-release lock (not shown) is provided for locking the head tube and handlebar assembly G between the extended position shown in FIG. 1A and the collapsed position shown in FIG. 1B. This structure of folding collapsible kick scooter is still not satisfactory in function. When collapsing the kick scooter, the user's hand tends to be injured by the protruding parts of the folding collapsible structure between the footplate B and the head tube and handlebar assembly G. Further, because the handlebar of the head tube and handlebar assembly G is not collapsible, the kick scooter still occupies much storage space when collapsed.

SUMMARY OF THE INVENTION

The present invention has been accomplished to provide a folding collapsible kick scooter, which eliminates the aforesaid drawbacks. It is one object of the present invention to provide a folding collapsible kick scooter, which is safe in use. It is another object of the present invention to provide a folding collapsible kick scooter, which occupies less storage space when collapsed. The folding collapsible kick scooter of the present invention comprises a head tube folding structure, which uses a quick-release lock to lock the head tube between an extended position and a collapsed position, and a handlebar folding structure, which uses a quick-release lock to lock the left handlebar and the right handlebar between an extended position and a collapsed position. The engagement parts of the head tube folding structure are concealed from sight and well protected by the head tube mounting frame.

DETAILED DESCRIPTION OF THE PREFERRED EMBODIMENT

Figure 1A:
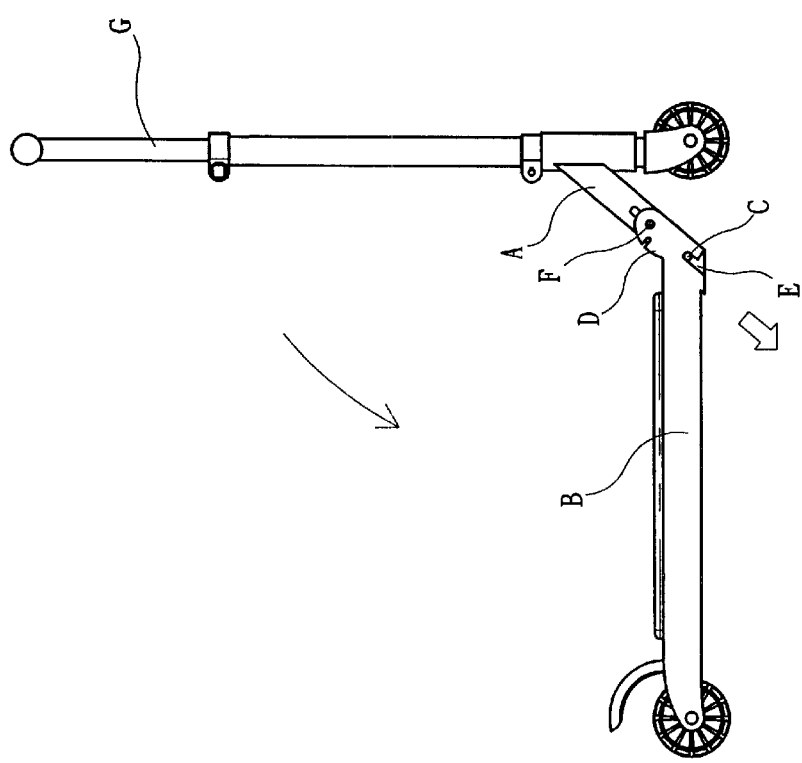
FIG. 1A shows a folding collapsible kick scooter set in the extended position according to the prior art.
Figure 1B:
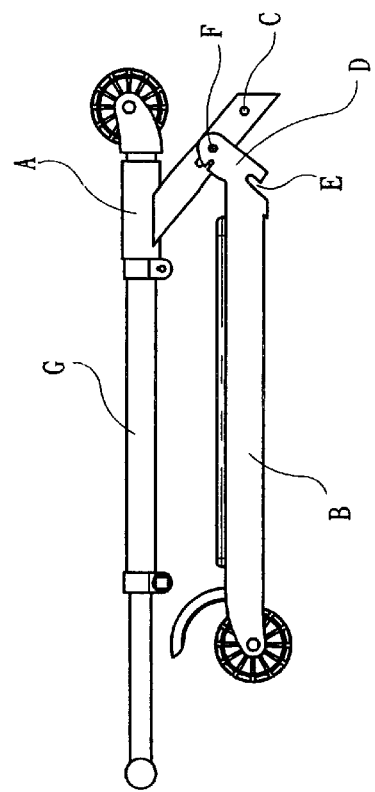
FIG. 1B shows the prior art folding collapsible kick scooter set in the collapsed position.
Figure 2:
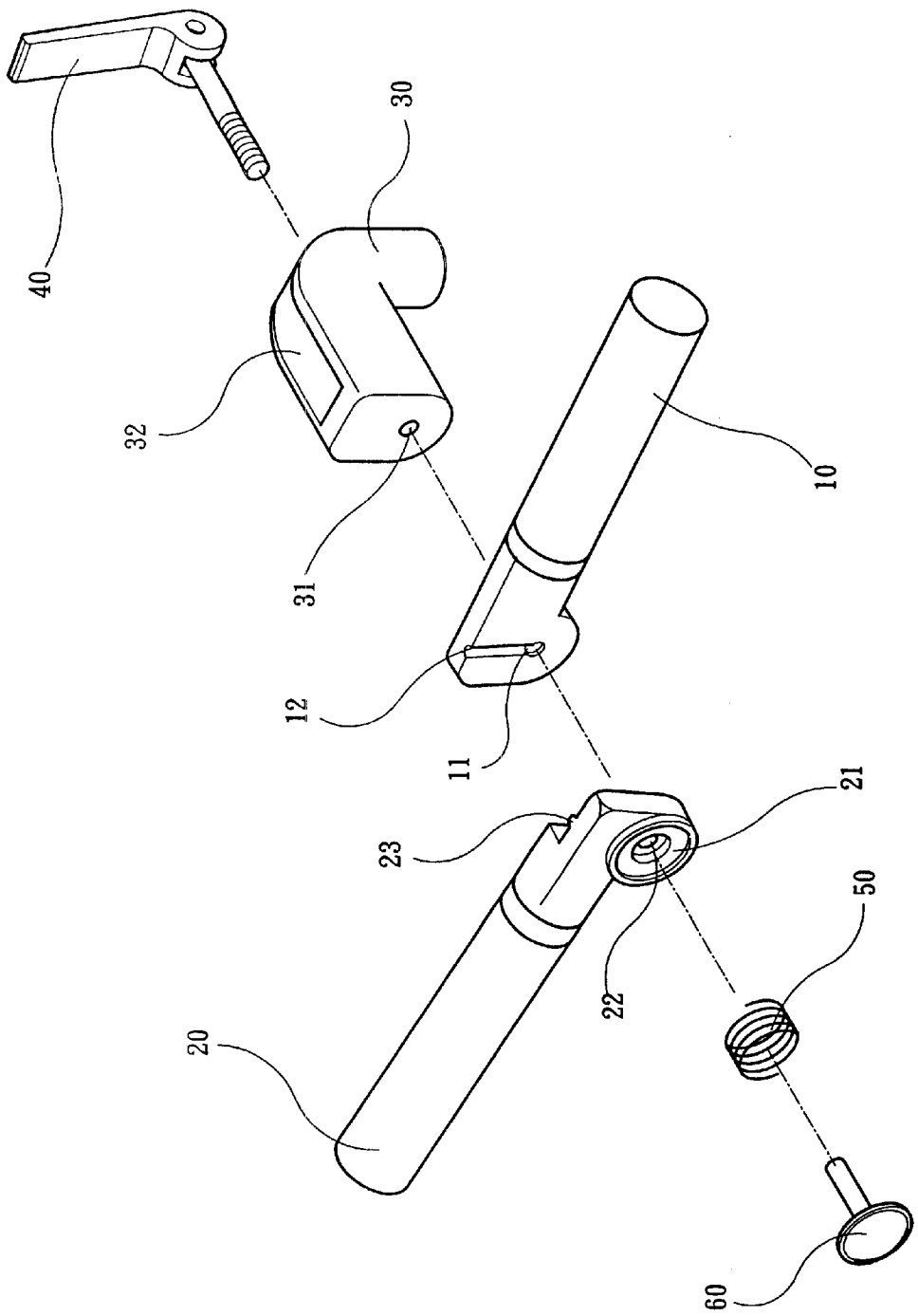
FIG. 2 is an exploded view of a handlebar folding structure for a folding collapsible kick scooter according to the present invention.
Figure 3:
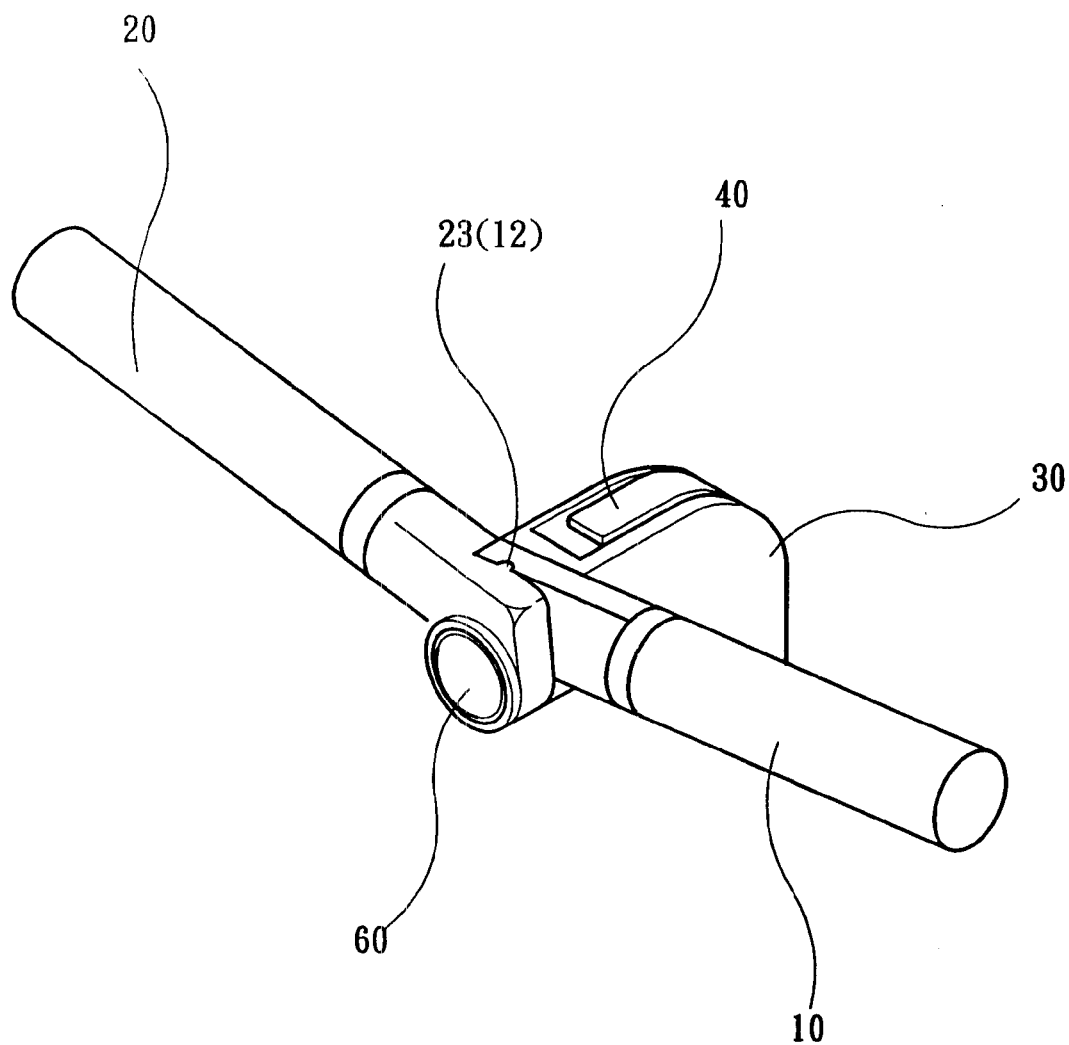
FIG. 3 is an assembly view of the handlebar folding structure shown in FIG. 2.

A folding collapsible kick scooter in accordance with the present invention comprises a handlebar folding structure and a head tube folding structure. As illustrated in FIGS. 2 and 3, the handlebar folding structure is comprised of two handlebars, namely, the right handlebar 10 and the left handlebar 20, a handlebar stem 30, a locking lever and screw rod assembly (formed of a screw rod and a locking lever pivoted to one end of the screw rod) 40, a compression spring 50, and a headed female screw 60. The right handlebar 10 comprises a coupling groove 12 transversely disposed at one end, namely, the inner end thereof, and a through hole 11 disposed at one end of the coupling groove 12. The left handlebar 20 comprises a receptacle 21 disposed at the front side of one end, namely, the inner end thereof, a through hole 22 extended through the center of the receptacle 21 corresponding to the through hole 11 of the right handlebar 10, a coupling rib 23 transversely disposed at the notched back sidewall of the inner end and adapted for engaging the coupling groove 12 of the right handlebar 10. The handlebar stem 30 comprises a top receiving open chamber 32 and a horizontal through hole 31. The screw rod of the locking lever and screw rod assembly 40 is inserted in proper order through the through hole 31 of the handlebar stem 30, the through hole 11 of the right handlebar 10 and the through hole 22 of the left handlebar 20. The headed female screw 60 is fastened up with the screw rod of the locking lever and screw rod assembly 40 and received in the receptacle 21 of the left handlebar 20. The compression spring 50 is received in the receptacle 21 of the left handlebar 20 and stopped between the left handlebar 20 and the head of the headed female screw 60. When assembled, the coupling rib 23 of the left handlebar 20 and the coupling groove 12 of the right handlebar 10 are engaged together, and the locking lever of the locking lever and screw rod assembly 40 is received in the top receiving open chamber 32 of the handlebar stem 30.

Figure 4:
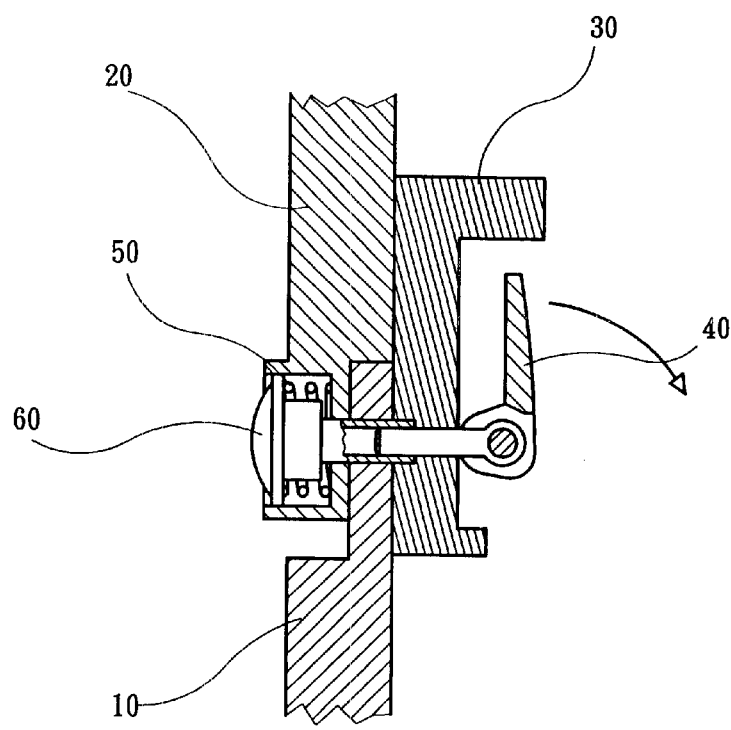
FIG. 4A is a sectional view of the handlebar folding structure of the present invention, showing the locking lever disposed in the locking position.
FIG. 4B is similar to FIG. 4A but showing the locking lever turned to the unlocking position.
Figure 4:
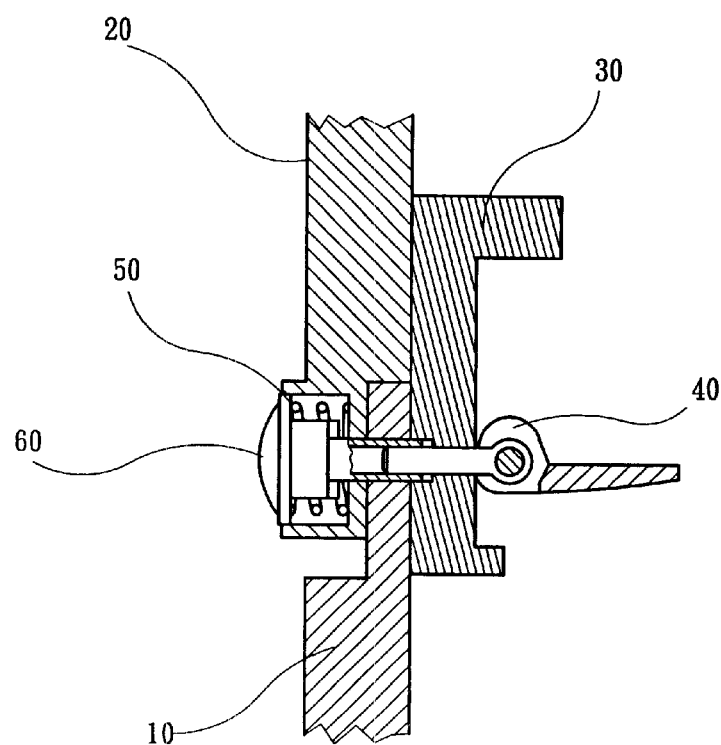
Figure 5:
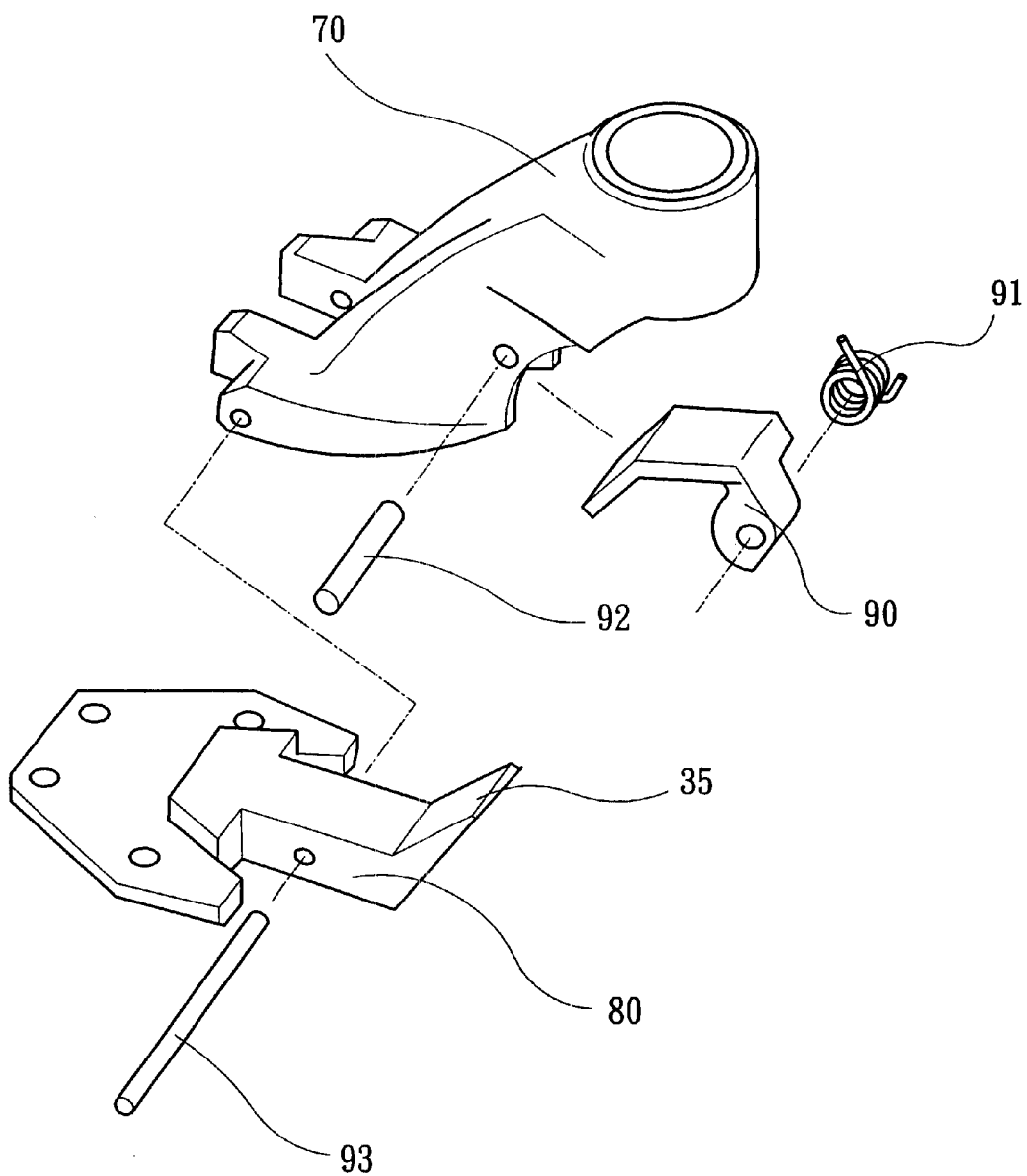
FIG. 5 is an exploded view of a head tube folding structure for a folding collapsible kick scooter according to the present invention.

Referring to FIGS. 4A and 4B, when turning the locking lever of the locking lever and screw rod assembly 40 from the locking (vertical) position shown in FIG. 4A to-the unlocking (horizontal) position shown in FIG. 4B, the compression spring 50 immediately pushes the headed female screw 60 outwards, and the handlebars 10 and 20 are released from the constraint, and allowed to be turned relative to each other to a collapsed condition. When in use, the handlebars 10 and 20 are turned outwards to a horizontal position where the coupling rid 23 and the coupling groove 12 are engaged together, and then the locking lever of the locking lever and screw rod assembly 40 is turned to the locking position to lock the handlebar folding structure in the operative position.

Figure 6A:
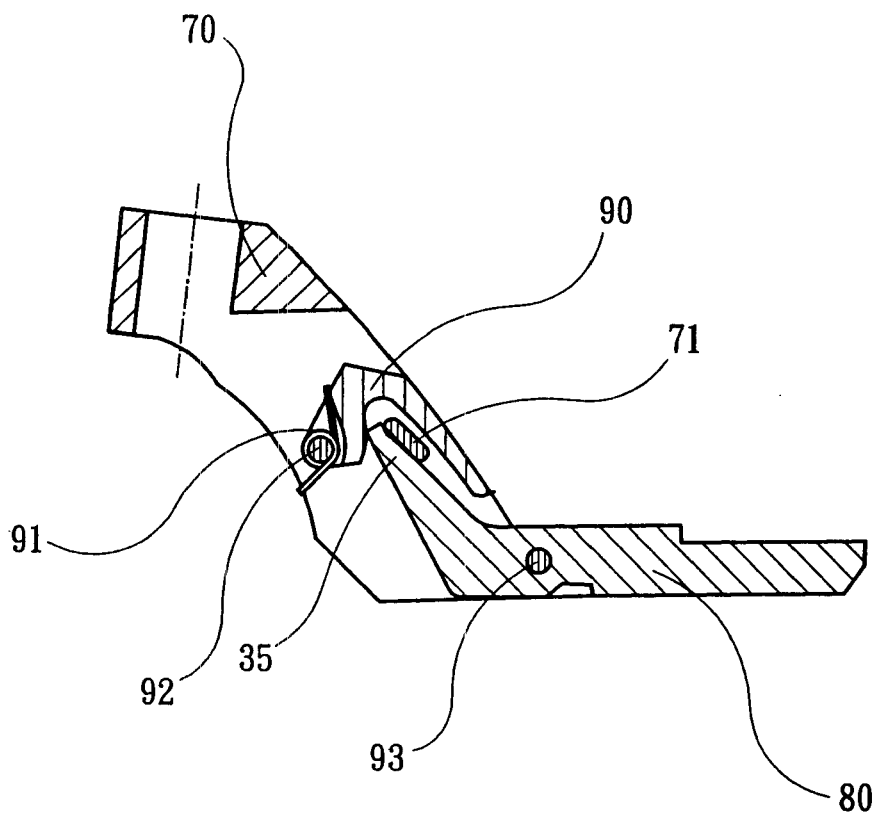
FIG. 6A is a sectional view showing the head tube folding structure locked in the extended position according to the present invention.
Figure 6B:
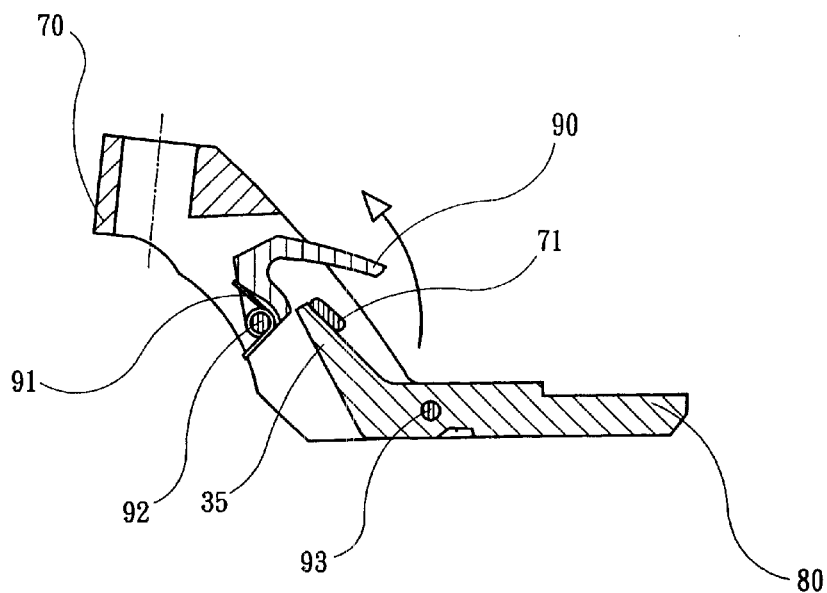
FIG. 6B is similar to FIG. 6A but showing the locking lever turned to the unlocking position.
Figure 6C:
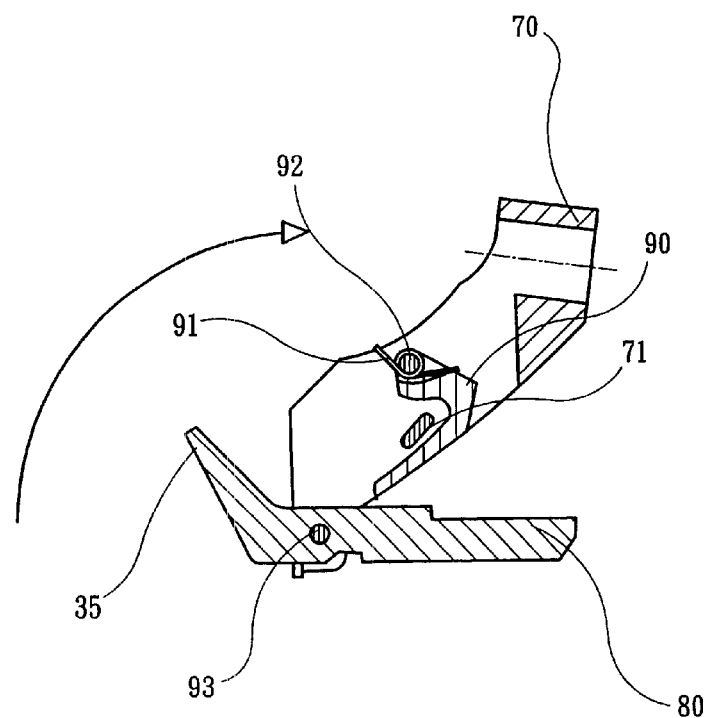
FIG. 6C illustrates the head tube folding structure turned to the collapsed position according to the present invention.
Figure 7A:
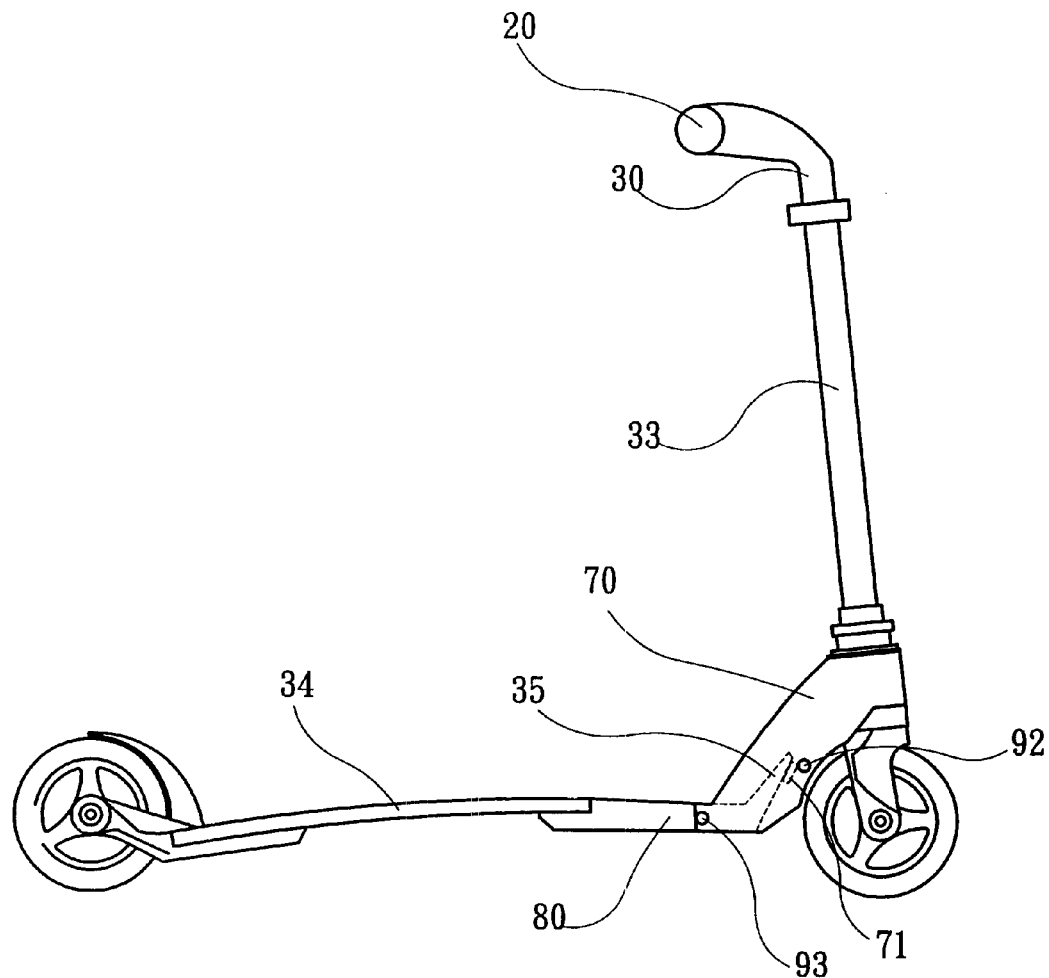
FIG. 7A illustrates a folding collapsible kick scooter constructed according to the present invention and set in the extended position.
Figure 7B:
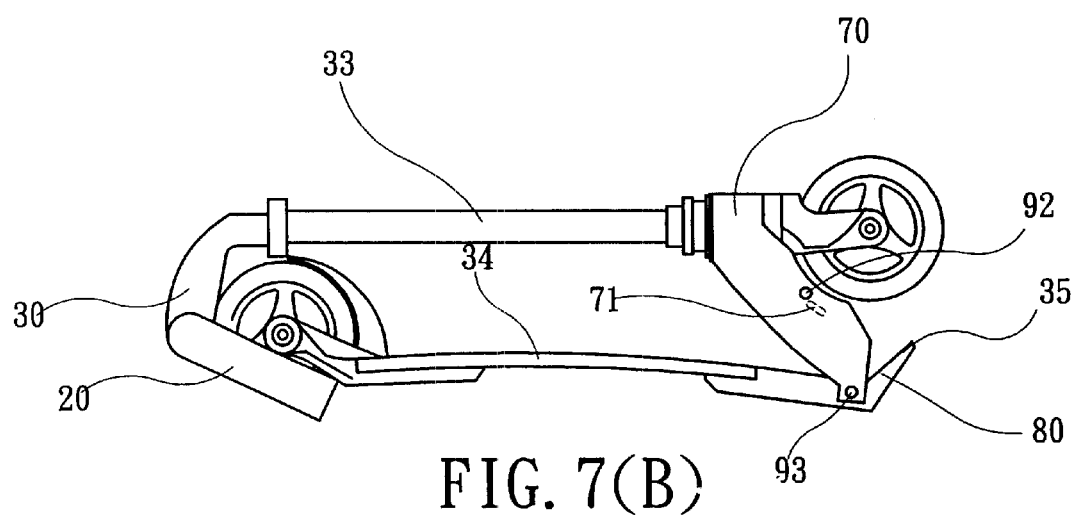
FIG. 7B shows the folding collapsible kick scooter of FIG. 7A set in the collapsed position.

Referring to FIGS. from 5 through 7, the head tube folding structure comprises a head tube mounting frame 70 fastened to the head tube 33, a footplate mounting frame 80 fixedly fastened to the front side of the footplate 34 and pivoted to the head tube mounting frame 70 by a pivot 93, a locking lever 90 pivoted to the head tube mounting frame 70 by a pivot 92, and a torsional spring 91 mounted on the pivot 92 to hold the locking lever 90 in the locking position. The footplate mounting frame 80 comprises a hook 35. The head tube mounting frame 70 comprises a locating rod 71 transversely disposed on the inside. After the locking lever 90 has been turned from the locking position shown in FIG. 6A to the unlocking position shown in FIGS. 6B and 6C, the head tube mounting frame 70 can be turned with the head tube 33 between the extended position shown in FIG. 7A to the collapsed position shown in FIG. 7B. When extended or collapsed, the locking lever 90 is turned from the unlocking position shown in FIGS. 6B and 6C to the locking position shown in FIG. 6A to hold down the locating rod 71 against the hook 35. After the head tube folding structure has been collapsed, the handlebars 10 and 20 of the handlebar folding structure are turned to the collapsed position as shown in FIGS. 4A and 4B.

It is to be understood that the drawings are designed for purposes of illustration only, and are not intended for use as a definition of the limits and scope of the invention disclosed.

What the invention claimed is:

1. A folding collapsible kick scooter comprising:

a handlebar folding structure, said handlebar folding structure comprising a right handlebar, said right handlebar comprising a coupling groove transversely disposed at an inner end thereof and a through hole disposed at one end of said coupling groove, a left handlebar, said left handlebar comprising a receptacle disposed at an inner end thereof, a through hole extending through a center of said receptacle, a coupling rib transversely disposed at a back sidewall of the inner end thereof and adapted for engaging the coupling groove of said right handlebar, a handlebar stem, said handlebar stem comprising a top receiving open chamber and a horizontal through hole, a locking lever and screw rod assembly, said locking lever and screw rod assembly comprising a screw rod inserted in proper order through the horizontal through hole of said handlebar stem, the through hole of said right handlebar and the through hole of said left handlebar and a locking lever pivoted to one end of said screw rod and receivable within said top receiving open chamber of said handlebar stem, a headed female screw threadedly engaged with the screw rod of said locking lever and screw rod assembly and received in the receptacle of said left handlebar, and a compression spring received in the receptacle of said left handlebar and stopped between said left handlebar and a head of said headed female screw; and a head tube folding structure, said head tube folding structure comprising a head tube mounting frame fixedly fastened to a head tube, said head tube mounting frame comprising a transversely extended locating rod, a first pivot, a footplate mounting frame fixedly fastened to a footplate and pivoted to said head tube mounting frame by said first pivot for enabling said head tube mounting frame together with said head tube to be pivoted relative to said footplate between an extended position and a collapsed position, said footplate mounting frame comprising a hook for stopping at the transversely extended locating rod of said head tube mounting frame while in said extended position, a second pivot, a locking lever pivoted to said head tube mounting frame by said second pivot and adapted to hold down the transversely extended locating rod of said head tube mounting frame on the hook of said footplate mounting frame, and a torsional spring mounted on said second pivot and stopped between the locking lever of said head tube folding structure and said head tube mounting frame.

* * * * *